United States Patent [19]

Roberts et al.

[11] 4,392,091
[45] Jul. 5, 1983

[54] VEHICLE PROPULSION CONTROL APPARATUS AND METHOD

[75] Inventors: Richard D. Roberts, South Park Township, Allegheny County; Lester J. Hoffman, Churchill Borough, both of Pa.

[73] Assignee: Westinghouse Electric Corp., Pittsburgh, Pa.

[21] Appl. No.: 298,693

[22] Filed: Sep. 2, 1981

[51] Int. Cl.³ .......................................... B61C 15/08
[52] U.S. Cl. ........................................ 318/52; 318/71
[58] Field of Search ..................... 318/49, 50, 52, 69, 318/71

[56] References Cited

U.S. PATENT DOCUMENTS

| | | | |
|---|---|---|---|
| 3,069,606 | 12/1962 | Pastoret et al. | 318/52 |
| 3,577,048 | 5/1971 | Nordin | 318/52 |
| 3,663,875 | 5/1972 | Ashiya | 318/52 |
| 3,719,868 | 3/1973 | McSparran | 318/52 |
| 3,728,596 | 4/1973 | Hermansson et al. | 318/52 |
| 3,783,339 | 1/1974 | Matty | 307/232 |
| 3,898,937 | 8/1975 | Johnson | 318/52 X |
| 3,912,034 | 10/1975 | Pallof | 318/52 X |
| 3,997,822 | 12/1976 | Logston, Jr. et al. | 318/52 |
| 4,095,153 | 6/1978 | Matty et al. | 318/376 |
| 4,136,303 | 1/1979 | Almquist et al. | 318/52 |
| 4,235,402 | 11/1980 | Matty et al. | 303/106 X |

OTHER PUBLICATIONS

Moxie et al., "Propulsion Control for Passenger Trains Provides High-Speed Service," Westinghouse Engineer, Sep. 1970, pp. 143-149.

Krings, "Alternative Systems for Rapid-Transit Propulsion and Electrical Braking," Westinghouse Engineer, Mar. 1973, pp. 34-41.

*Primary Examiner*—Ulysses Weldon
*Attorney, Agent, or Firm*—R. G. Brodahl

[57] ABSTRACT

The propulsion control apparatus for a vehicle including a plurality of motor driven wheel units detects a slip or slide operation of at least one wheel unit in accordance with a predetermined difference between sensed motor currents, and reduces the tractive effort of those wheel units until the sensed motor currents no longer have that difference.

11 Claims, 10 Drawing Figures

VEHICLE PROPULSION CONTROL APPARATUS AND METHOD

CROSS REFERENCE TO RELATED APPLICATION

The present application is related to a patent application Ser. No. 902,001, filed Apr. 27, 1978 and entitled "Transit Vehicle Motor Effort Control Apparatus and Method" by T. C. Matty, now issued as U.S. Pat. No. 4,282,466, which is assigned to the same assignee and the disclosure of which is incorporated herein by reference.

BACKGROUND OF THE INVENTION

It is known in the prior art to control the speed of a vehicle propulsion direct current series motor by a chopper apparatus including a thyristor switch device in series with the motor. Speed control of the motor is provided by varying the width of the voltage pulses supplied to the motor such that the resulting average power supplied to the motor establishes the operational speed thereof. A commutation circuit including a charge capacitor has been used to provide a biased voltage across a conducting thyristor device for commutating the conduction of that thyristor device. A traction motor is operative in a motoring mode when the passenger vehicle is being propelled or accelerated along a track and in a brake mode when the vehicle is being stopped or decelerated.

As described in a published article in the Westinghouse Engineer for March 1973 at pages 34 through 41, the average voltage supplied to the motor armature is controlled by adjusting the ratio of chopper off time to the chopper on time, with the resulting average motor armature current determining the motor torque for moving the vehicle along a track. In the motoring or power mode of operation, the motors of a vehicle are connected by mechanical switches in relation to a direct current voltage source such that current is supplied through a chopper when the chopper is on and through the motors to ground. When the chopper is turned off, the energy stored in the motor reactor and the inductance of the motor field maintains current flow in the motor circuit through a free wheeling diode. In the brake or deceleration mode of operation, the motors in the prior art are reconnected by mechanical changeover switches with the motors operative as self-excited generators to provide dynamic or regenerative braking of the vehicle. With the chopper on, the motor current increases and with the chopper off, the motor current is forced into the power supply through the free-wheeling diode by the motor reactor.

It is known in the prior art to provide a slip slide control system for a vehicle such as a transit car as described in an article published in the Westinghouse Engineer for September 1970 at pages 143 to 149 wherein once a pair of wheels is slipping or sliding, then corrective action is taken to reduce the tractive or braking effort applied to the axle to permit those wheels to regain the speed equivalent to train speed. The desired tractive or braking effort is then reapplied.

U.S. Pat. No. 3,069,606 discloses the utilization of an auxiliary field for a DC traction motor arranged in a bridge circuit and operative with a train vehicle to respond to differences in the speeds of selected motors to limit the motor speed for protecting a motor against excessive voltage and excessive speed.

SUMMARY OF THE INVENTION

In a vehicle propulsion motor control apparatus, a plurality of DC series motors is coupled with respective wheel units of the vehicle and provided in a bridge circuit arrangement of those motors, with one current sensing device operative with a first branch of that bridge circuit and another current sensitive device operative with a second branch of that bridge circuit to sense the current in each armature leg of the bridge arrangement in relation to each of a motor mode and a brake mode of operation of those motors. The back EMF across each motor armature is proportional to RPM and the current of that motor. If the RPM of the respective motors in each branch circuit is the same, the motor current for each branch circuit will be the same. A control microprocessor senses any difference between the motor currents of the two branch circuits for detecting and controlling the slip or spin of any one or more wheel units in relation to the other wheel units of the vehicle.

DESCRIPTION OF A PREFERRED EMBODIMENT

Figure 1:
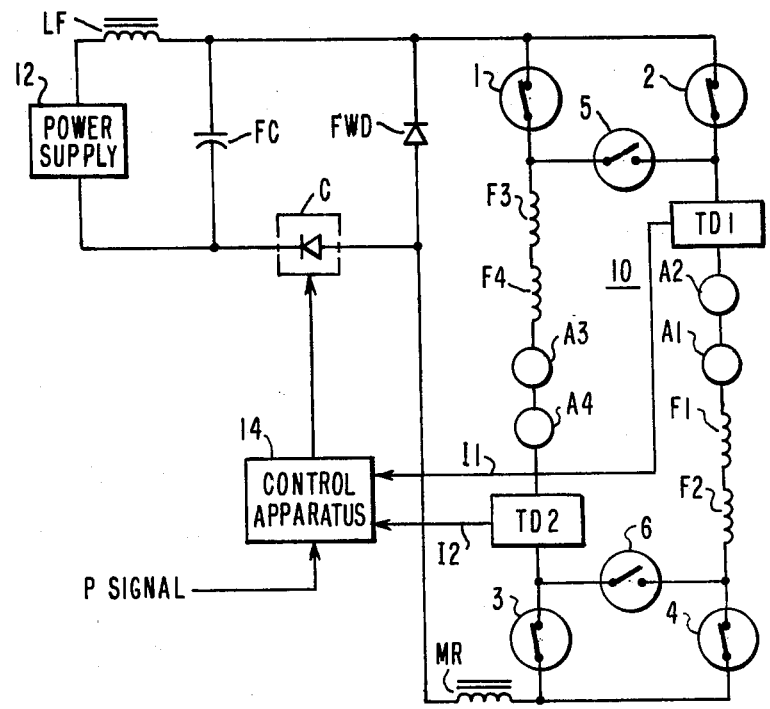
FIG. 1 shows a prior art motor control apparatus for a plurality of vehicle propulsion motors in the power mode.

FIG. 1 shows a prior art motor control apparatus for a plurality of vehicle propulsion motors operative in the power mode. The motors are well known DC series motors each including an armature and a field winding, with the first and second motor armature A1 and A2 being connected in a first bridge circuit including first and second motor field windings F1 and F2 while the third and fourth motor armatures A3 and A4 are connected in a second bridge circuit including the third and fourth motor field windings F3 and F4 such that the four motors are connected with two in series and the two groups of two motors being connected in parallel as determined by closing the mechanical switches 1, 2, 3 and 4 and by opening the mechanical switches 5 and 6. In the power mode, a chopper C is used to regulate the current in the motor circuit 10. Turning the chopper C on builds up currents in the motors by completing the circuit from the DC power supply 12 through the motors in the motor circuit 10 to ground. When the chopper C is turned off, the energy stored in the motor reactor MR and the inductance of the motors in the motor circuit 10 maintains current flow through the free-wheeling diode FWD. The operation of the chopper C in this regard is described in greater detail in the above-referenced published article in the Westinghouse Engineer for March 1973 and in the above cross-referenced application.

The average voltage applied to the motors is controlled by adjusting the ratio of the off time to the ON time of the chopper C. This adjustment is made by the control apparatus 14 in response to the effort request P signal and the motor currents I1 and I2 from the current sensing transducers TD1 and TD2 for maintaining the desired average motor current and therefore the average motor torque. The chopper C switches at the normal cycle time frequency of approximately 218 Hz.

Figure 2:
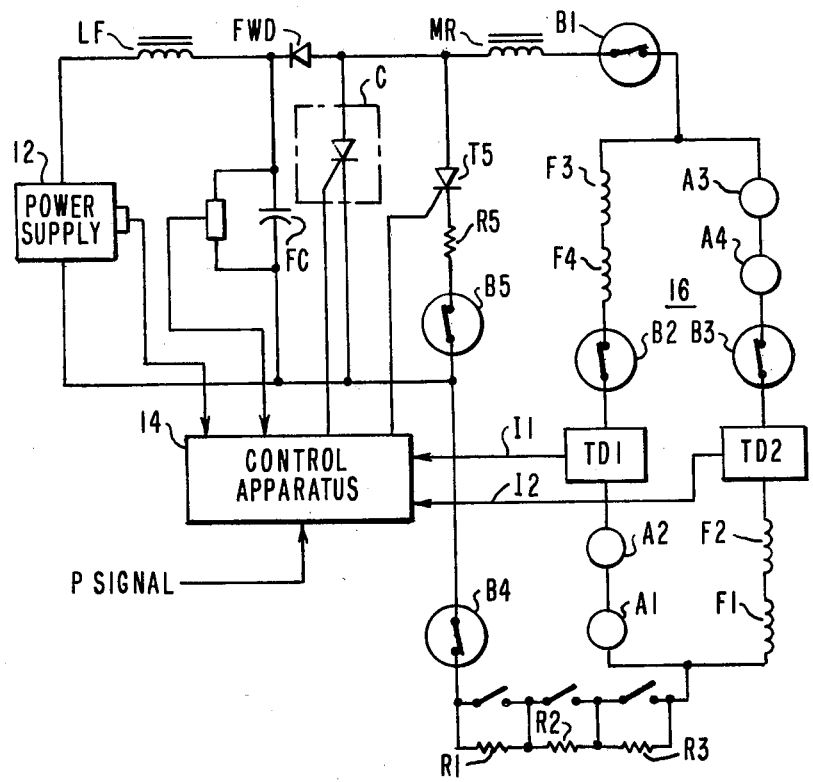
FIG. 2 shows a prior art motor control apparatus for a plurality of vehicle propulsion motors in the brake mode.

FIG. 2 shows a prior art motor control apparatus for a plurality of vehicle propulsion motors operative in the brake mode. For the brake mode of operation, the motors are changed to the arrangement as shown in the motor circuit 16 of FIG. 2 by means of well-known power brake changeover mechanical switches B1, B2, B3, B4 and B5 in accordance with the above-referenced article in the Westinghouse Engineer for March 1973 and as shown in the above cross-referenced application. The circuit shown in FIG. 2 is arranged for regenerative or dynamic braking with the motors operative as self-excited generators. The fields are connected to force load division between the paralleled generators. In regenerative braking, the function of the chopper C is the same as is its function in the power mode with the on/off ratio being regulated to maintain the desired current and with the greater motor current providing the greater braking to the vehicle. When the chopper C is turned on, the current in the motor circuit 16 increases. When the chopper C is turned off, the current flowing in the motor is forced back to the power supply 12 through the free-wheeling diode FWD by the motor reactor MR. The control apparatus 14 for logically controlling the operation of the chopper C during the brake mode also monitors the voltage 18 across the line filter capacitor FC and the line voltage 20 to control the chopper on/off ratio in response to the P signal in such a manner as to prevent the capacitor voltage 18 from exceeding the line voltage 20. When the capacitor voltage 18 approaches the line voltage 20, the thyristor T5 is fired such that the generated current is then supplied through the dynamic braking resistor R5 as desired.

Figure 3:
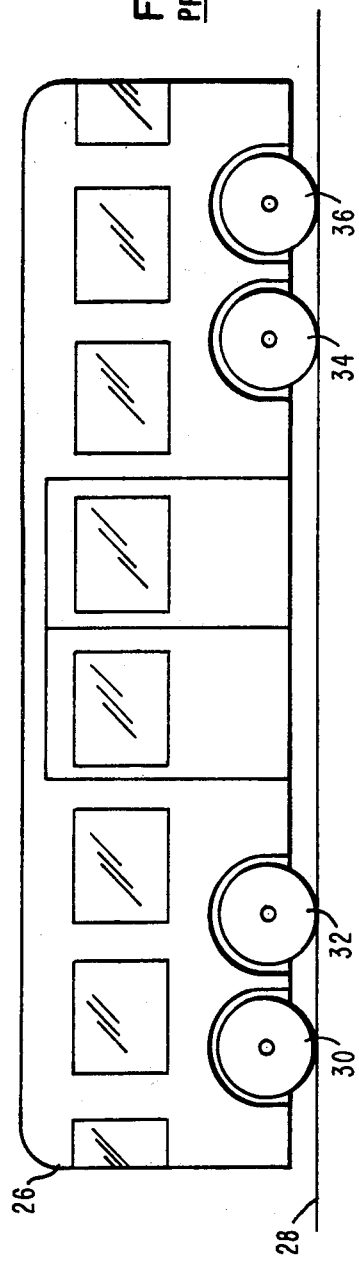
FIG. 3 shows a prior art transit vehicle operative with a roadway track.

In FIG. 3, there is shown a prior art transit vehicle 26 operative with a roadway track 28 and including wheel units 30, 32, 34 and 36.

Figure 4:
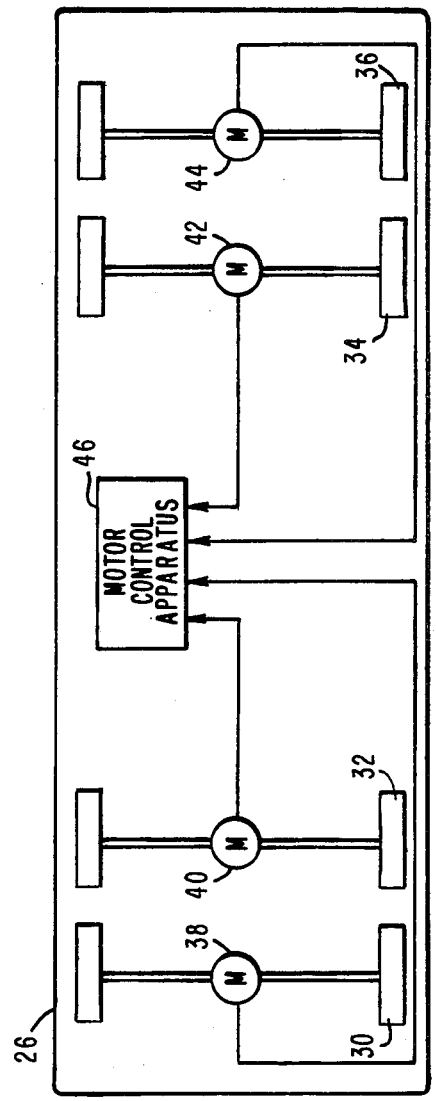
FIG. 4 shows an under-view of the vehicle shown in FIG. 3, including a plurality of propulsion motors coupled with respective wheel units.

FIG. 4 shows an under-view of the vehicle 26 shown in FIG. 3 and includes a plurality of propulsion motors coupled with the respective wheel units, with the motor 38 being coupled with the wheel unit 30, the motor 40 being coupled with the wheel unit 32, the motor 42 being coupled with the wheel unit 34 and the motor 44 being coupled with the wheel unit 36. Motor control apparatus 46 is operative to control the operation of the respective propulsion motors 38, 40, 42 and 44.

Figure 5:
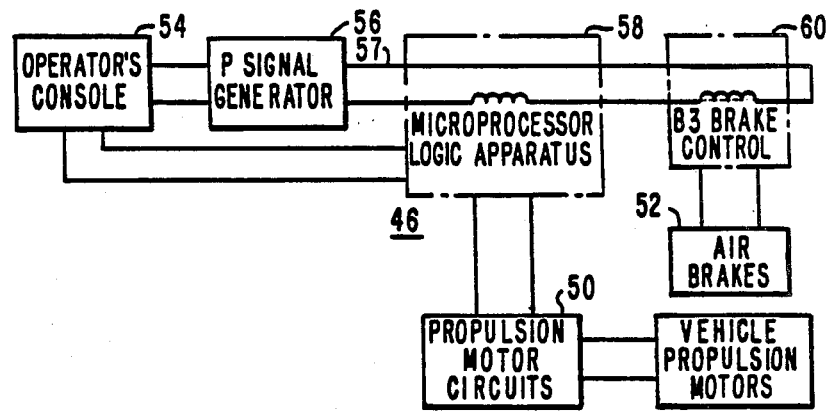
FIG. 5 schematically shows a prior art power and brake motor control apparatus for the motor circuit and mechanical brakes of the vehicle shown in FIG. 4.

In FIG. 5, there is shown the motor control apparatus 46 shown in FIG. 4 to provide desired power and brake control of the propulsion motors 50 and the air brakes 52. An operator's console 54 is provided for the vehicle operator and which determines the tractive effort request from a P signal generator 56 operative with each of a microprocessor logic apparatus 58 and a B3 brake control 60. The microprocessor logic apparatus 58 operates with the propulsion motor control circuits 50 shown in FIGS. 1 and 2. The B3 brake control is a well-known prior art brake control presently available from the Westinghouse Air Brake Company as Part No. 584631 for a single end car and as Part No. 585636 for a double end car. The microprocessor logic apparatus 58 determines the operation of propulsion motor circuits 50 which are operative with the motors 38, 40, 42 and 44 shown in FIG. 4. The air brakes are well-known air brakes.

Figure 6:
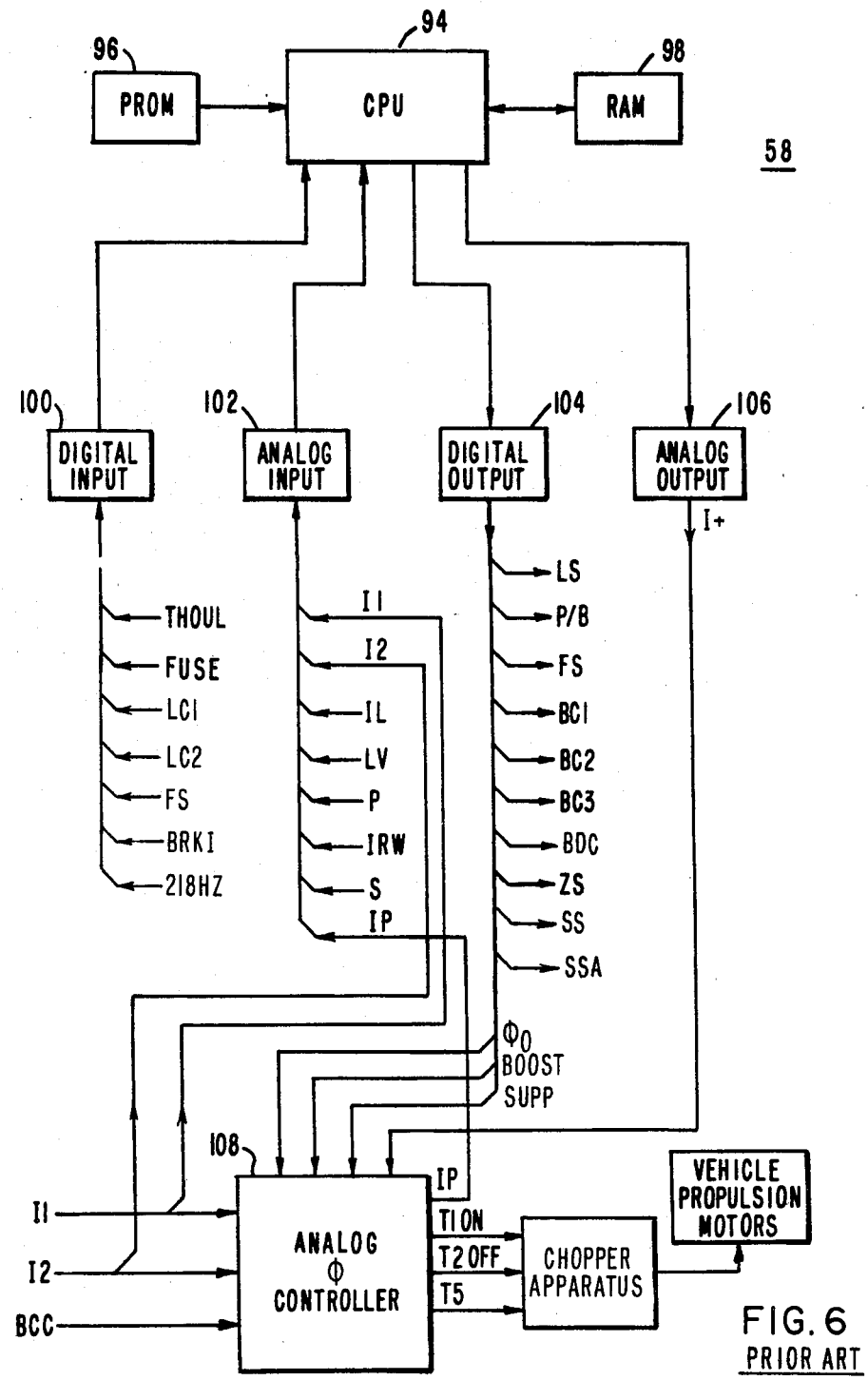
FIG. 6 provides a functional showing of a prior art microprocessor logic apparatus for controlling the motor circuit of a vehicle such as shown in FIG. 5.

FIG. 6 shows the prior art microprocessor logic apparatus 58 shown in FIG. 5 such as described in the above cross-referenced application, which description is incorporated herein by reference.

Figure 7A:
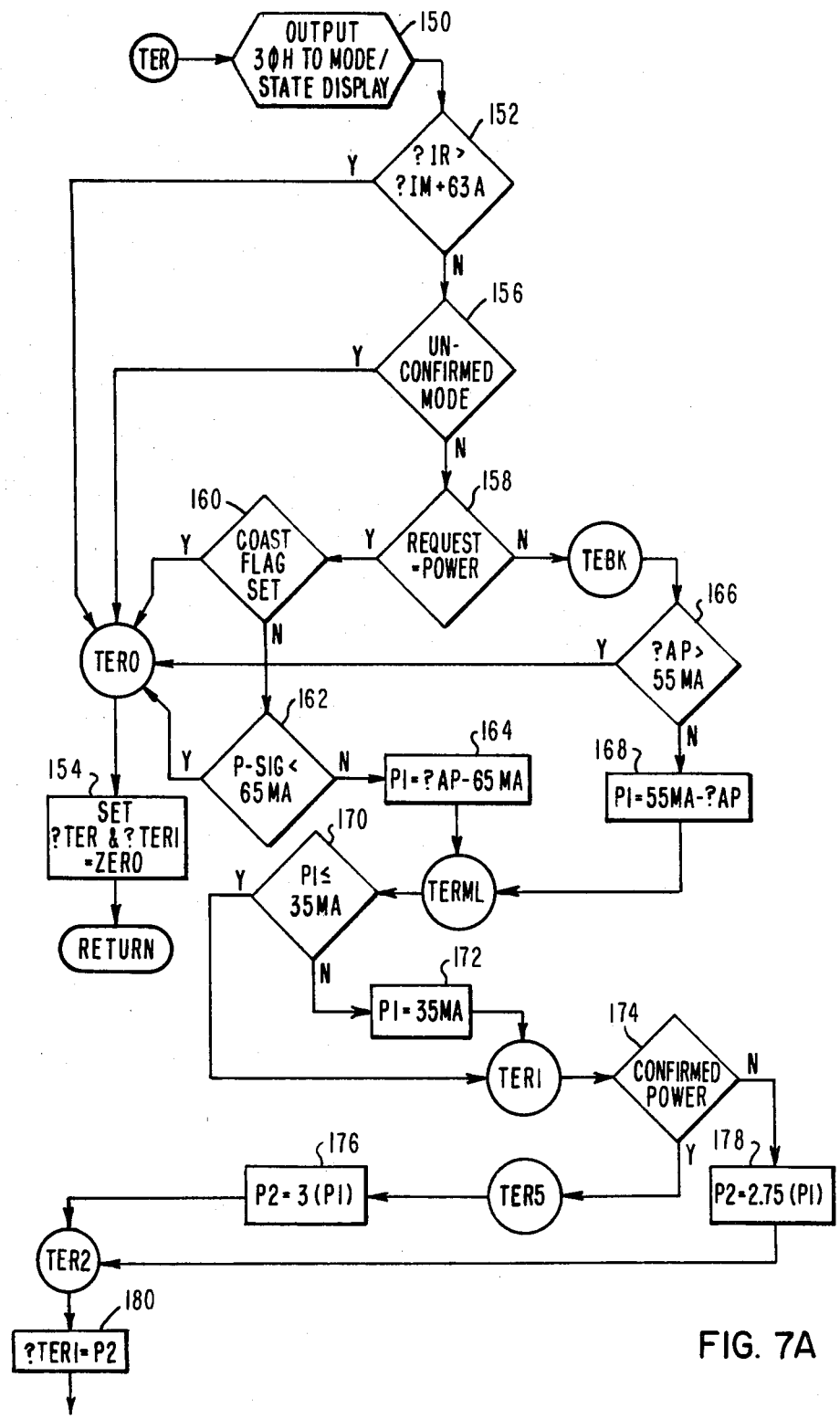
FIGS. 7A and 7B show a flow chart for an illustrative tractive effort control application program for the microprocessor logic apparatus of FIG. 5.
Figure 7B:
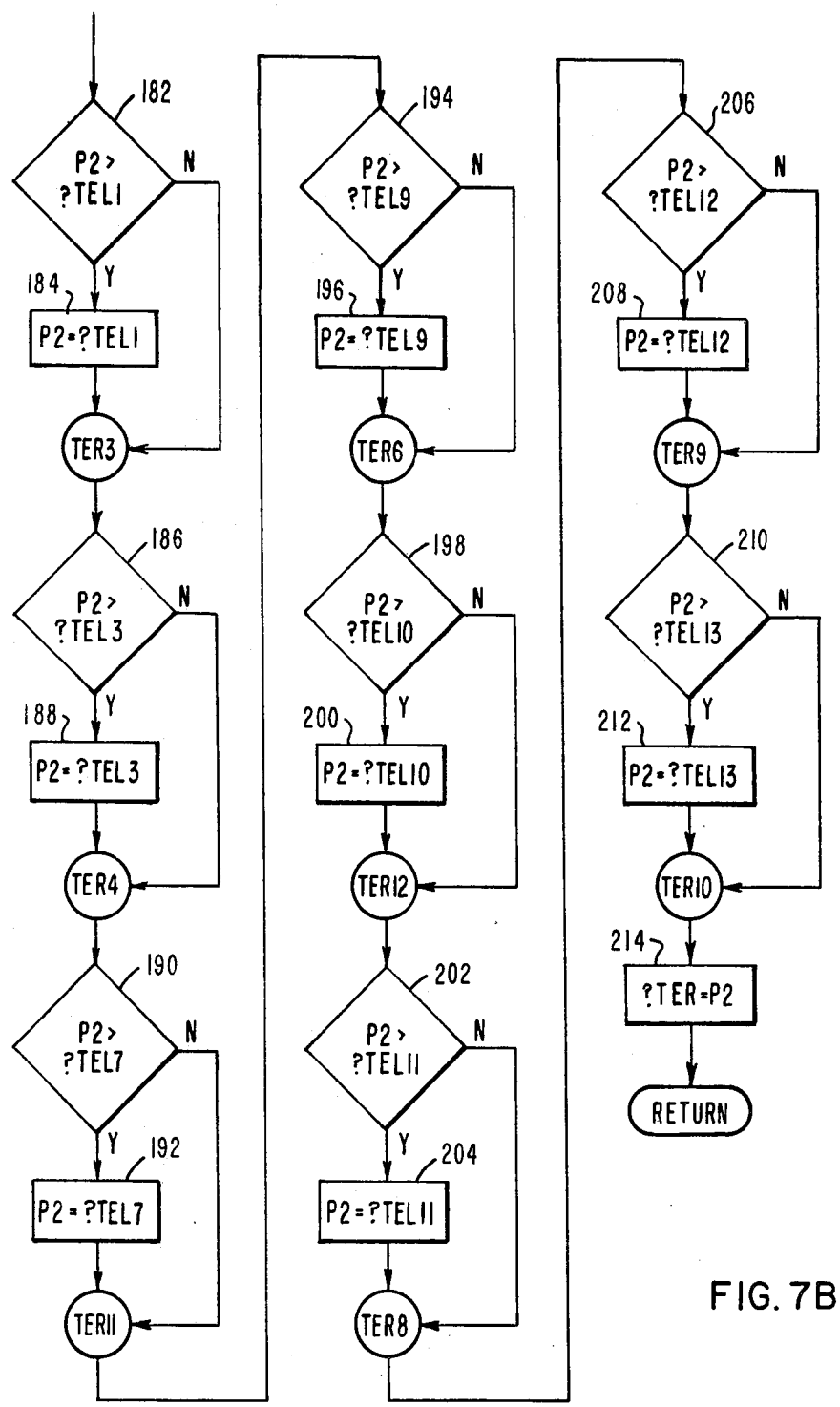

FIGS. 7A and 7B show a flow chart for the application program provided to derive a tractive effort request TER from the P signal for the microprocessor logic apparatus 58 of FIG. 5. The TER routine flow chart provides at step 150 a display output. At step 152, a check is made to see if the current request is greater than actual motor current plus 63 amperes to see if substantially more current is being asked for than is actually being obtained. If so, something might be wrong, so at step 154, the TER and TER1 are set equal to 0. If the operation appears to be okay at step 152, at step 156, a check is made to see if the mode word indicates how the motor circuit is set up such as in brake mode, in power mode or in neither. If it is neither and unconfirmed, the program goes to TER0 and at step 154, sets the indicated values to zero as before. If the motor circuit is set up at step 158, a check is made to see if there is a request for power or a request for brake. If power is requested, at step 160 a check is made to see if the vehicle is in coast. If so, at step 154, TER and TER1 are set to zero. If the vehicle is not coasting, at step 162 the P signal is checked to see if it is less than 65 milliamps, and if it is, at step 154, TER and TER1 are set to zero. If not, at step 164 the intermediate value P1 is set equal to AP, which is the P signal stored in RAM minus 65 milliamps. If the request was for brake at step 158, then at step 166 a check is made to see if the stored P signal AP is greater than 55 milliamps and not in the brake range. If so, go to step 154 as before. If okay, at step 168 the intermediate value P1 is set equal to 55 milliamps minus the stored P signal AP. At step 170, a check is made to see if P1 is less than or equal to 35 milliamps. If not, at step 172 P1 is set equal to 35 milliamps. In power the P signal should be from 65 to 100 milliamps which is a difference of 35 milliamps, and in brake the P signal should be from 20 to 55 milliamps which is again a 35 milliamps difference. The program goes to step 174 where a check is made to see if the motor circuit is set up in power, and if so, at step 176 P2 is set equal to three times P1. If the motor circuit is in brake, at step 178 P2 is set equal to 2.75 times P1. In power the vehicle has a 3 MPH per second maximum acceleration rate, and in brake the vehicle has a 2.75 MPH per second maximum deceleration rate. At step 180, TER1 is set equal to P2. Then limits are applied to P2 such as at step 182, if P2 is greater than TEL1, it is limited to TEL1 at step 184. At step 186 if P2 is greater than TEL3, at step 188 it is limited to TEL3. At step 190 if P2 is greater than TEL7, it is limited at step 192 to TEL7. The same checking and limiting is repeated at steps 194 and 196 for TEL9 at steps 198 and 200 for TEL10, the phase angle limit bit, at steps 202 and 204 for TEL11, at steps 206 and 208 for TEL12, and at steps 210 and 212 for TEL13. AT step 214 the tractive effort request TER is set equal to P2.

With the motor arrangement shown in FIG. 4, the vehicle 26 can be moving along the track 28 with the propulsion of only the motors 38 and 40 of the front truck or with the propulsion of only the motors 42 and 44 of the rear truck, when there is some operational problem with the motors of one of the trucks. In effect, a respective current transducer as shown in FIGS. 1 and 2 is provided to sense the motor current of each truck and to operationally check the wheel units of one truck in relation to the wheel units of the other truck.

Figure 8:
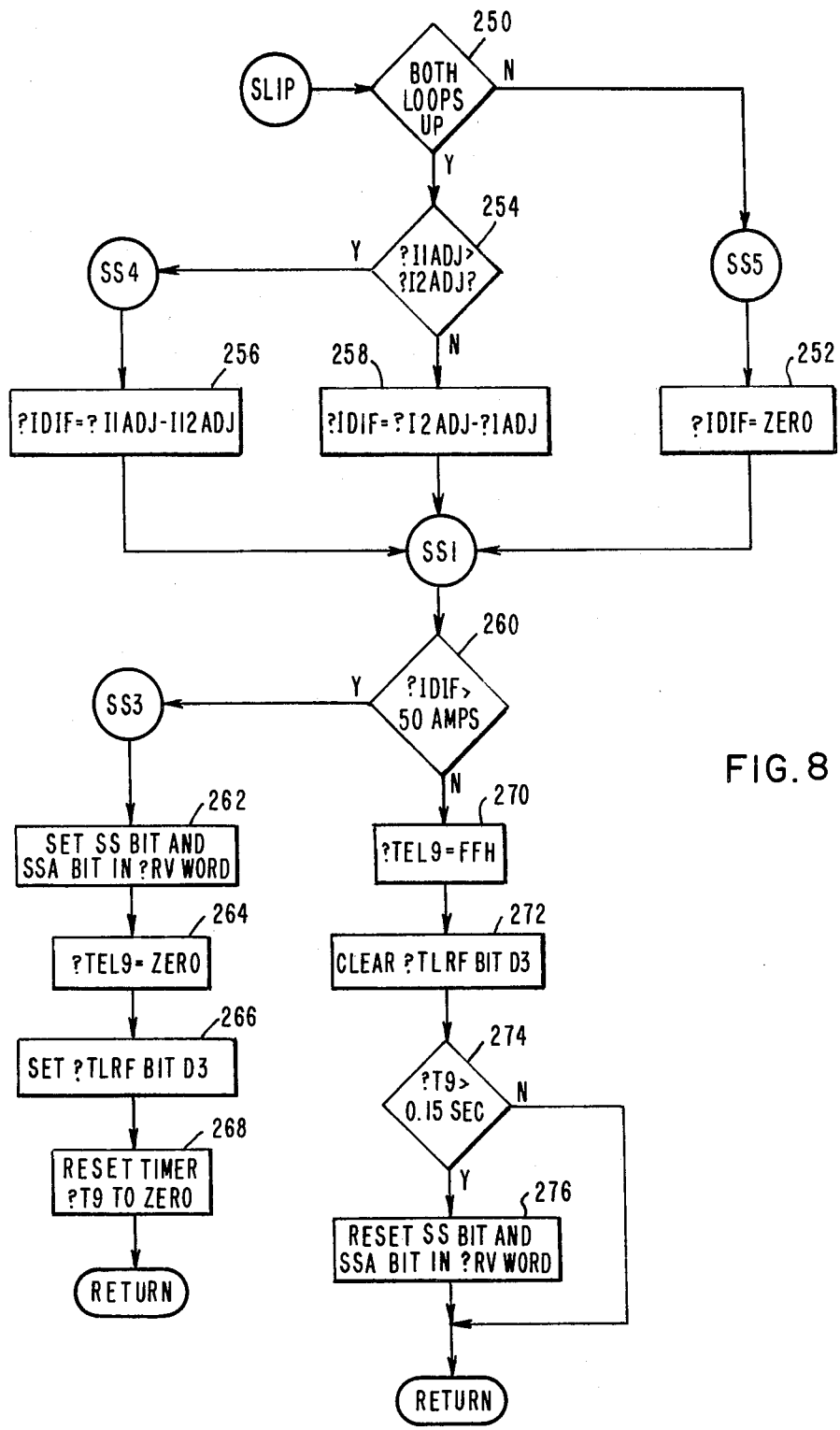
FIG. 8 shows a flow chart for the slip slide control apparatus of the present invention.

In the flow chart for the slip/slide application control program of the present invention shown in FIG. 8, at step 250 a check is made to see if both motor loops or branch circuits are in operation. If not, at step 252, the current difference IDIF is set to zero since this mode with the motors of one truck not operating does not permit detecting a slip or slide condition of the vehicle. If so, at step 254 a check is made to see if I1ADJ is greater than I2ADJ. The signal I1ADJ comes from transducer TD1, with a determined offset being subtracted from the actual current reading. The signal I2ADJ comes from the transducer TD2, with an offset subtracted. At one of steps 256 or 258, the smaller motor current is subtracted from the larger to give IDIF, the branch motor current difference. At step 260, a check is made to see if IDIF is greater than 50 amps, which would indicate that one wheel unit is slipping or sliding in relation to the other wheel unit and in relation to the adhesion level of the track on which the vehicle is operating. If it is, at step 262 the slip slide bit SS is set and a slip slide annunciator bit SSA is set in the RV output word. The slip slide bit SS goes to the B3 brake control 60 to indicate a slip/slide condition is detected and it is desired to back off on the air brake effort. The slip slide annunciator bit SSA turns on a light on the operator's console to indicate to the operator the detection of a slip or slide condition. At step 264, the tractive effort limit TEL9 is set equal to zero. At step 266, the flag bit in the TLRF word is set for troubleshooting and to find out which tractive effort limit is in effect. At step 268, the timer T9 is reset to zero. If there was not a current difference of 50 amps at step 260, at step 270, the tractive effort limit TEL9 is set up to the high value FF. At step 272, the flag bit in the TLRF word is cleared. At step 274, a check is made to see if the timer T9 has timed up to greater than 0.15 second. If it has, at step 276 the slip slide bit SS is reset and the slip slide annunciator bit SSA is reset in the RV output word.

The actual tractive effort request is then determined in the TER program shown in FIGS. 7A and 7B. The P signal is converted to tractive effort request and then limits are applied in relation to TEL9 from the slip/slide program shown in FIG. 8.

The control apparatus shown in FIG. 5 includes a control panel as part of the operator's console that determines the P signal and the brake signal on the line 57, which is actually a line for each of these signals. The microprocessor logic apparatus 58 responds to the P signal for determining the acceleration or deceleration rates to be provided by the propulsion motor control 50.

If a wheel unit slip is detected in power or a wheel unit slide is detected in brake, the motor branch current difference IDIF will become greater than 50 amperes, and the limit TEL9 is set to the low value zero at step 264 of the FIG. 8 program to result in P2 being set equal to TEL9 at step 196 and then TER being set to P2 at step 214 of the FIGS. 7A and 7B program.

Figure 9:
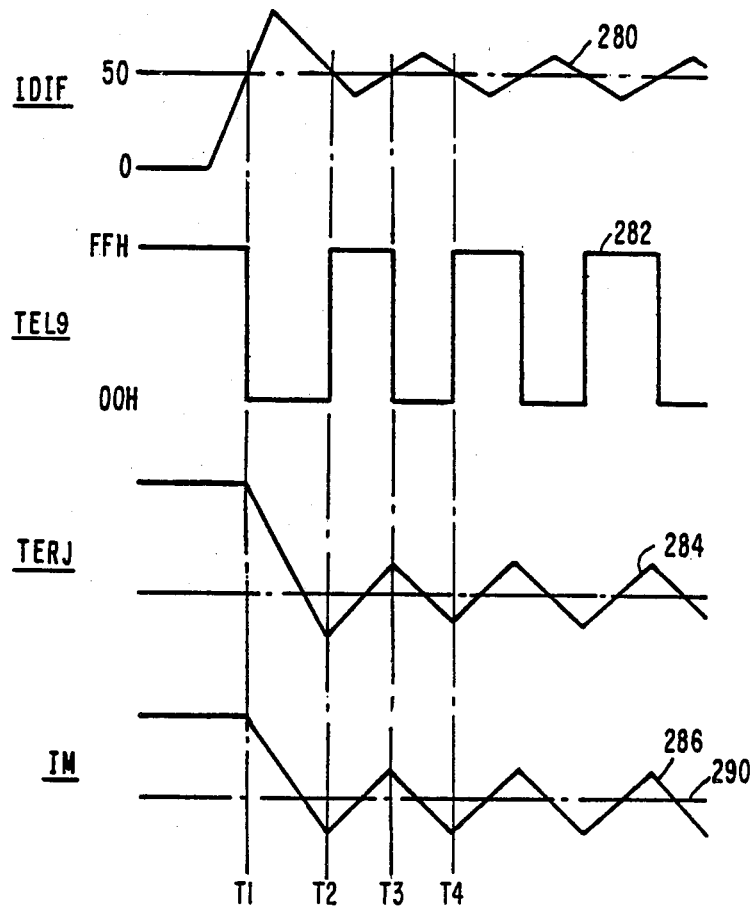
FIG. 9 shows curves to illustrate the average motor current and the motor current difference relationships provided by the present invention.

As shown in FIG. 9, at time T1 the wheel starts to slip and the current difference IDIF shown by curve 280 begins to increase. At time T2 the current difference IDI exceeds 50 amps and TEL9 shown by curve 282 is set to zero, causing TERJ to start to decrease in a jerk limited manner which causes motor current shown by curve 286 to begin to decrease. At time T3 the current difference is decreased to the point where IDIF no longer exceeds 50 amps, and TEL9 is set to FF again, allowing TERJ to start to increase, which causes IM to increase. At time T4 the current difference has increased to the point where IDIF exceeds 50 amps, and TEL 9 is again set to 00; causing TERJ to decrease and causing IM to decrease. The motor current will tend to oscillate around the adhesion level 290 at which the wheels would adhere to the rail.

In brake operation, the P signal generator 56 provides a brake signal when the operator's console 54 establishes that the vehicle should be in the brake mode of operation. The setting of the slip/slide bit SS at step 262 in conjunction with this brake signal from the P signal generator 56 causes the B3 brake controller 60 to cut back on the braking effort in a manner similar to that shown in relation to the power operation in FIG. 9. The mechanical delays in the operation of the air brake system provide a similar time delayed oscillation of the vehicle substantially along the available wheel adhesion level in the brake mode of operation.

In the control operation of the trolley vehicle shown in FIGS. 3 and 4, the input P signal becomes tractive effort request TER which is then jerk limited to TERJ and multiplied by weight adjust to give TERW representing the actual torque desired from the propulsion motors. The TERW signal determines the actual motor currents of the propulsion motors. A look-up table in the control CPU memory shown in FIG. 6 responds to the TERW input and determines the desired current request IR which is then output to the analog phase controller to establish the on/off duty cycle of the chopper for establishing the desired average motor current.

As shown in FIGS. 1 and 2, a current transducer TD1 and TD2 are provided in each motor branch path to give I1 and I2 which are compared to see if they are equal. If they are equal, this indicates no slip or slide condition. If these currents are not equal, then a determination is made to establish which one is greater, and the smaller is subtracted from the larger with the difference being stored in the microprocessor memory. A check is made to see if this difference is greater than a predetermined amount, such as 50 amperes. If it is, the vehicle is considered to be in a slip or a slide mode of operation and the tractive effort request TER is set to zero. This results in TERJ the jerk limit tractive effort request to begin ramping down and the weight adjusted tractive effort request TERW similarly begins to ramp down. In power operation, this will reduce the torque at all vehicle wheels that are trying to accelerate and will stop any tendency to spin of those wheels. Depending upon the track adhesion level, the torque will be lowered as shown in FIG. 9 until no wheel spin occurs. When the current differential for a cycle of the controlled microprocessor becomes less than 50 amperes, then the tractive effort request TER will go back up to the level established by the P signal until some later cycle when the current differential again becomes greater than 50 amperes. This cyclical operation can cause the jerk limited tractive effort request TERJ to reduce to a lower average value where the motor currents are such that no slip or slide condition causes the current differential to become greater than 50 amperes.

The typical trolley vehicle also includes air operated mechanical brakes in addition to the electric brakes. The air brakes are released when a slip or slide condition is determined. In effect, a time delay is provided before the full release of the air brakes such that there can result in a cyclic on and off ramp adjustment of the average brake effort provided by the air brakes in a manner similar to the on and off adjustment of the effective electric brake effort that is provided by the propulsion motors.

The phase angle is controlled by the on/off ratio of the chopper such that for 100% phase angle, the chopper is on all the time and for 0% phase angle, the chopper is off all the time. The current request IR from the microprocessor logic apparatus 58 causes the phase angle controller 108 to provide on and off firing pulses which control the respective motor currents. The motor currents I1 and I2 are read back into the control logic for each cycle of control CPU 94 operation to determine if the tractive effort request TER should or should not be set to zero for the next cycle of operation.

The equation describing the armature back EMF is:

$$V_{emf} = K\phi\omega$$

where $\phi$ is the flux of the motor field windings, $\omega$ is the rotational speed of the motor, and K is a proportionality constant. From this equation, it can be seen that if the rotational speed $\omega$ is increased due to a wheel slipping on ice or the like, then the back EMF of the armature would also increase which would decrease the voltage across the field winding. This would in turn decrease the current through the field. There are hall effect current transducers in each motor branch to sense the motor currents in each branch. There will normally be some small differences between the currents of each branch shown in FIGS. 1 and 2 due to the fact that no two motors are exactly the same. When the difference between these currents exceeds some predetermined amount such as 50 amperes, the chopper will start to decrease its on/off ratio and begin lowering the chopper voltage. This will lower the current in the motor circuit branches until the difference between the branch currents approaches and stays at approximately 50 amperes and provide a restricted operation of the wheel units. It will maintain this restricted operation situation until the wheels get enough traction to stop spinning and then the P signal will determine the tractive effort request to establish the motor currents in accordance with normal and desired operation of the vehicle control apparatus.

GENERAL DESCRIPTION OF INSTRUCTION PROGRAM LISTING

In Appendix A and Appendix B, there are included instruction program listings that have been prepared to control a passenger vehicle in accordance with the here-disclosed control system and method and the respective flow charts shown in FIGS. 7 and 8. These instruction program listings are written in the assembly language of the Intel 8080 computer system. Many of these computer systems have already been supplied to customers, including customer instruction books and descriptive documentation to explain to persons skilled in this art the operation of the hardware logic and the executive software of this digital computer system.

In relation to the program listing included in the above cross-referenced application PI is TER, PO is TERJ and PN is AP in relation to the program listings here included.

```
01920; ################################################
01930
01940 TER:    MVI   A, 30H
01950         OUT   2DH
01960         LDA   ?IR
01970         MOV   B, A
01980         LDA   ?IM
01990         ADI   10H      ; IM + 63 AMPS
02000         JNC   TER7
02010         MVI   A, 0FFH  ; TRAP FOR OVERFLOW
02020 TER7:   CMP   B        ; IM + 63 A < IR
02030         JC    TER0     ; YES
02040         LXI   H, ?AP
02050         LDA   ?MODE
02060         MOV   B, A
02070         ANI   08H
02080         JNZ   TER0     ; MODE IS UNCONFIRMED
02090         MOV   A, B
02100         ANI   04H
02110         JZ    TEBK     ; BRAKE REQUEST
02120
02130                        ; POWER REQUEST
02140
```

```
02150            LDA      ?FLG8
02160            ANA      A           ;COAST FLAG SET?
02170            JNZ      TER0        ;YES
02180            MOV      A,M         ;GET P-SIG
02190            CPI      82H
02200            JC       TER0        ;P SIG < 65 MA
02210            SUI      82H         ;P1=AP-65MA
02220
02230            ;MAX LIMIT
02240
02250 TERML:     CPI      46H
02260            JC       TER1        ;P1 < 35 MA
02270            MVI      A,46H       ;SET P1 TO 35 MA
02280            ;TER SCALING ON PWR OR BRK
02290
02300 TER1:      MOV      C,A         ;C = P1
02310            MOV      A,B         ;GET MODE
02320            ANI      01H
02330            JNZ      TER5        ;POWER MODE
02340 ;BRAKE MODE
02350            MOV      A,C
02360            RRC
02370            ANI      7FH
02380            MOV      B,A         ;B = 0.5(P1)
02390            RRC
02400            ANI      3FH         ;A = 0.25(P1)
02410            ADD      B
02420            ADD      C
02430            ADD      C
02440            MOV      C,A         ;P2 = 2.75(P1)
02450            JMP      TER2
02460
02470 TER5:      MOV      A,C
02480            ADD      C
02490            ADD      C
02500            MOV      C,A         ;P2 = 3(P1)
02510
02520            ;APPLY LIMITS TO TER
02530
02540 TER2:      MOV      A,C
02550            STA      ?TER1
02560            LXI      H,?TEL1
02570            CMP      M           ;TER > TEL1?
02580            JC       TER3        ;NO
02590            MOV      A,M         ;TER=TEL1
02600 TER3:      INR      L
02610            CMP      M           ;TER > TEL3?
02620            JC       TER4        ;NO
02630            MOV      A,M         ;TER=TEL3
02640 TER4:      INR      L
02650            CMP      M           ;TER > TEL7
02660            JC       TER11       ;NO
02670            MOV      A,M         ;TER=TEL7
02680 TER11:     INR      L
02690            CMP      M           ;TER > TEL9?
02700            JC       TER6        ;NO
```

```
02710           MOV     A,M         ;TER=TEL9
02720 TER6:     INR     L
02730           CMP     M           ;TER > TEL10?
02740           JC      TER12       ;NO
02750           MOV     A,M         ;TER=TEL10
02760 TER12:    INR     L
02770           CMP     M           ;TER > TEL11?
02780           JC      TER8        ;NO
02790           MOV     A,M         ;TER=TEL11
02800 TER8:     INR     L
02810           CMP     M           ;TER > TEL12?
02820           JC      TER9        ;NO
02830           MOV     A,M         ;TER=TEL12
02840 TER9:     INR     L
02850           CMP     M           ;TER > TEL13
02860           JC      TER10       ;NO
02870           MOV     A,M         ;TER=TEL13
02880 TER10:    STA     ?TER
02890           RET
02900
02910           ;BRAKE REQUEST
02920
02930 TEBK:     MOV     A,M         ;GET P-SIG
02940           CPI     6EH
02950           JNC     TER0        ;AP > 55 MA
02960           MOV     E,A
02970           MVI     A,6EH
02980           SUB     E           ;P1=55 MA-AP
02990           JMP     TERML
03000
03010           ;SET REQUEST TO ZERO
03020
03030 TER0:     XRA     A
03040           STA     ?TER
03050           STA     ?TER1
03060           RET
03070
20800 ;CALLED BY CYCLE ROUTINE
20900 ;#########################################
21000
21100 SLIP:     PUSH    B
21200           LDA     ?FDBK
21300           ANI     30H         ;MASK LC1 & LC2 BITS
21400           CPI     30H         ;BOTH LOOPS UP?
21500           JNZ     SS5         ;NO
21600           LDA     ?I1ADJ
21700           MOV     B,A         ;I1ADJ IN B REGISTER
21800           LDA     ?I2ADJ
21900           MOV     C,A         ;I2ADJ IN C REGISTER
22000           CMP     B           ;I2ADJ > I1ADJ?
22100           JC      SS4         ;NO
22200           SUB     B           ;I2ADJ - I1ADJ
22300 SS1:      STA     ?IDIF
22400           CPI     0DH         ;DIFF. > 50 AMPS?
22500           JNC     SS3         ;YES
22600           MVI     A,0FFH
22700           STA     ?TEL9       ;SET TEL9 AT FF
```

```
22800        LDA     ?TLRF
22900        ANI     0F7H        ; RESET TLRF BIT D3
23000        STA     ?TLRF
23100        LDA     ?T9
23200        CPI     20H         ; T9 > 0.15 SEC. ?
23300        JC      SS2         ; NO. DON'T RESET S/S BITS
23400        LDA     ?RV
23500        ANI     9FH         ; RESET S/S BITS TO ZERO
23600        STA     ?RV
23700 SS2:   POP     B
23800        RET
23900
24000 SS3:   LDA     ?RV         ; SLIP-SLIDING AWAY
24100        ORI     60H         ; SET SLIP/SLIDE BITS TO 1
24200        STA     ?RV
24300        XRA     A
24400        STA     ?TEL9       ; SET TEL9 TO ZERO
24500        STA     ?T9         ; RESET TIMER T9
24600        LDA     ?TLRF
24700        ORI     08H         ; SET TLRF BIT D3
24800        STA     ?TLRF
24900        POP     B
25000        RET
25100
25200 SS4:   MOV     A, B
25300        SUB     C           ; I1ADJ - I2ADJ
25400        JMP     SS1
25500
25600 SS5:   XRA     A           ; SET IDIF TO ZERO
25700        JMP     SS1
25800
```

We claim:

1. In motor control apparatus for a vehicle operative with a track having an adhesion level and provided with a tractive effort request signal and having at least two wheel units, with a different one of a plurality of propulsion motors being coupled with each said wheel unit, the combination of:

control means responsive to the tractive effort request signal for controlling the propulsion motors to provide one operation of the wheel units, means for establishing a first current of the motor coupled with a first of said wheel units, means for establishing a second current of the motor coupled with the second of said wheel units, and means for comparing said first and second currents to provide in response to a predetermined difference between the first and second currents a limit signal to control the operation of said wheel units in relation to said adhesion level, with said control means being responsive to said limit to decrease said tractive effort request such that the average motor current is decreased to provide another operation of the wheel units in accordance with said adhesion level.

2. The motor control apparatus of claim 1, with said one operation being a normal operation of the wheel units and with said another operation being a restricted operation of the wheel units.

3. The motor control apparatus of claim 1, with said means for comparing being operative to establish the predetermined difference between the first and second motor currents to provide said limit signal in relation to said predetermined difference.

4. The motor control apparatus of claim 1,
with said comparing means providing the limit signal to have a high value when the actual difference between the first and second currents is less than said predetermined difference and providing the limit signal to have a low value when said actual difference is greater than said predetermined difference.

5. The motor control apparatus of claim 1,
with said limit signal having a first value for a first comparison relationship when the actual difference between the first and second currents is greater than said predetermined difference and having a second value for a second comparison relationship when the actual difference between the first and second currents is less than said predetermined difference, and
with said control means being responsive to the first value of the limit signal to reduce the tractive effort of the wheel units.

6. In the method of controlling a vehicle operative with a track having an adhesion level and responsive to a tractive effort request signal, with said vehicle having at least first and second propulsion motors connected with respective wheel units, the steps of
responding to the tractive effort request signal to determine a normal operation of said propulsion motors,
determining the current of a first of said propulsion motors,
determining the current of a second of said propulsion motors,
establishing the actual difference between the first motor current and the second motor current in relation to said adhesion level, and
providing a reduced operation of said first and second propulsion motors when said actual difference is greater than a predetermined amount of current.

7. The method of claim 6, including providing a control limit for the operation of the first and second motors and having one of a first value or a second value in relation to said predetermined difference amount between said first motor current and the second motor current,
providing said normal operation when said control limit has a first value, and
providing said reduced operation when said control limit has a second value.

8. The method of claim 6, with said reduced operation being provided such that the average of the first and second motor currents is reduced when one of the wheel units is operating above the track adhesion level.

9. The method of claim 6, with said normal operation and said reduced operation being alternately provided when the tractive effort of one wheel unit is operating above the adhesion level of said track.

10. The method of claim 6, with the normal operation and the reduced operation being alternately provided in relation to the adhesion level of the track such that the actual difference between the first and second motor currents approaches said predetermined amount of current.

11. The method of claim 6, with said reduced operation being provided such that the resulting tractive effort of each wheel unit is reduced until the first and second motor currents do not have a difference greater than said predetermined amount of current.

* * * * *